United States Patent
De Graaf et al.

(10) Patent No.: US 6,852,762 B2
(45) Date of Patent: Feb. 8, 2005

(54) INTEGRATED PROCESS FOR HYDROCARBON SYNTHESIS

(75) Inventors: Winnifred De Graaf, Amsterdam (NL); Abdul Razak Mohamad Ali, The Hague (NL); Thian Hoey Tio, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/481,651

(22) PCT Filed: Jun. 24, 2002

(86) PCT No.: PCT/EP02/07210

§ 371 (c)(1),
(2), (4) Date: Dec. 22, 2003

(87) PCT Pub. No.: WO03/000627

PCT Pub. Date: Jan. 3, 2003

(65) Prior Publication Data

US 2004/0242707 A1 Dec. 2, 2004

(30) Foreign Application Priority Data

Jun. 25, 2001 (EP) .......................................... 01202439

(51) Int. Cl.$^7$ ............................................... C07C 27/00
(52) U.S. Cl. ..................... 518/705; 518/700; 518/702; 518/703; 518/704
(58) Field of Search .............................. 518/700, 702, 518/703, 704, 705

(56) References Cited

U.S. PATENT DOCUMENTS 4,833,170 A    5/1989    Agee

FOREIGN PATENT DOCUMENTS

| CA | 1288781 | 9/1991 | ............. C07C/1/04 |
| DE | 3244252 | 11/1982 | ............. C01B/3/38 |
| GB | 2183672 | 6/1987 | ............. C07C/1/02 |
| WO | 91/15446 | 10/1991 | ............. C07C/27/06 |
| WO | 94/21512 | 9/1994 | ............. B63B/35/44 |
| WO | 97/12118 | 4/1997 | ............. E21B/43/01 |

*Primary Examiner*—J. Parsa

(57) ABSTRACT

The invention relates to a process for producing liquid hydrocarbons from a hydrocarbonaceous feedstock involving:

(i) catalytically reforming at least part of the hydrocarbonaceous feedstock at elevated temperature and pressure with steam in at least one reforming zone;
(ii) heating the reforming zone(s) by means of a carbon dioxide containing heating gas containing a product obtained by partial oxidation of the reformer product obtained in step (i) and carbon dioxide depleted light product obtained in step (vi) with an oxygen-containing gas in an oxidation zone;
(iii) separating carbon dioxide from cooled down heating gas obtained in step (ii); (iv) catalytically converting at least part of the carbon dioxide depleted gas steam obtained in step (iii) at elevated temperature and pressure into normally liquid hydrocarbons;
(v) separating product stream obtained in step (iv) into a light product having mainly unconverted synthesis gas, inerts and light hydrocarbons and a heavy product; having mainly normally liquid and solid hydrocarbons;
(vi) separating carbon dioxide from the light product obtained in step (v); and
(vii) combining at least part of the carbon dioxide feed obtained in step (iii) and/or step (vi) with the hydrocarbonaceous feedstock for step (i).

20 Claims, 1 Drawing Sheet

US 6,852,762 B2

INTEGRATED PROCESS FOR HYDROCARBON SYNTHESIS

FIELD OF THE INVENTION

The present invention relates to an improved process for the preparation of liquid hydrocarbons from a hydrocarbonaceous feedstock, especially a gaseous hydrocarbon feedstock as methane from natural sources, preferably natural gas.

BACKGROUND OF THE INVENTION

Many documents are known describing processes for the conversion of (gaseous) hydrocarbonaceous feedstocks, especially methane from natural sources, e.g. natural gas, associated gas and/or coalbed methane, into liquid products, especially methanol and liquid hydrocarbons, particularly paraffinic hydrocarbons. At ambient temperature and pressure these hydrocarbons may be gaseous, liquid and (often) solid. In these documents reference is often made to remote locations and/or off-shore locations, where no direct use of the gas is possible. Transportation of the gas, e.g. through a pipeline or in the form of liquefied natural gas, requires extremely high capital expenditure or is simply not practical. This holds even more in the case of relatively small gas production rates and/or fields. Reinjection of gas will add to the costs of oil production, and may, in the case of associated gas, result in undesired effects on the crude oil production. Burning of associated gas has become an undesired option in view of depletion of hydrocarbon sources and air pollution. A process often used for the conversion of carbonaceous feedstocks in liquid and/or solid hydrocarbons is the well-known Fischer Tropsch process.

In WO 94/21512 a process for the production of methanol has been described from an off-shore natural gas field using a floating platform. However, no integrated, efficient, low-cost process scheme has been described.

In WO 97/12118 a method and system for the treatment of a well stream from an off-shore oil and gas field has been described. Natural gas is converted into syngas using pure oxygen in an autothermal reformer, a combination of partial oxidation and adiabatic steam reforming. The syngas (comprising a considerable amount of carbon dioxide) is converted into liquid hydrocarbons and wax. No fully integrated process scheme for a highly efficient, low capital process is described in this document.

In WO 91/15446 a process is described to convert natural gas, particularly remote location natural gas (including associated gas), in the form of normally liquid hydrocarbons suitable for fuel use via methanol/dimethyl ether. However, no integrated, efficient, low-cost process scheme has been described.

In U.S. Pat. No. 4,833,170 a process is described for the production of heavier hydrocarbons from one or more gaseous hydrocarbons. The gaseous hydrocarbons are converted into syngas by autothermal reforming with air in the presence of recycled carbon dioxide and steam. However, no (energy) integrated, efficient, low-cost process scheme has been described.

In CA 1,288,781 a process for the production of liquid hydrocarbons has been described comprising the steps of catalytically reforming the hydrocarbonaceous feed, heating the reforming zone by means of a carbon dioxide-containing heating gas comprising a product which has been obtained by partial oxidation of reformer product, separating carbon dioxide from the heating gas, catalytically converting the reformer product after separating off carbon dioxide into liquid hydrocarbons and combining the carbon dioxide obtained above with the hydrocarbonaceous feed used in the catalytic reforming process.

SUMMARY OF THE INVENTION

An object of the present invention is to provide an efficient, process- and energy-integrated scheme for the production of especially (easily manageable) normally liquid hydrocarbons (S.T.P.) and normally solid hydrocarbons (S.T.P.) from light hydrocarbons.

The present invention relates to a process for producing liquid hydrocarbon for producing liquid hydrocarbons from a hydrocarbonaceous feedstock which comprises the following steps:

(i) catalytically reforming at least part of the hydrocarbonaceous feedstock at elevated temperature and pressure with steam in at least one reforming zone, (ii) heating the reforming zone(s) by means of a carbon dioxide containing heating gas comprising a product obtained by partial oxidation of reformer product obtained in step (i) and carbon dioxide depleted light product obtained in step (vi) with an oxygen containing gas in an oxidation zone;

(iii) separating carbon dioxide from cooled down heating gas obtained in step (ii);

(iv) catalytically converting at least part of the carbon dioxide depleted gas stream obtained in step (iii) at elevated temperature and pressure into normally liquid hydrocarbons;

(v) separating product stream obtained in step (iv) into a light product comprising mainly unconverted synthesis gas, inerts and light hydrocarbons and a heavy product comprising mainly normally liquid and solid hydrocarbons;

(vi) separating carbon dioxide from light product obtained in step (v); and (vii) combining at least part of the carbon dioxide feed obtained in step (iii) and/or step (vi) with hydrocarbonaceous feed for step (i).

BRIEF DESCRIPTION OF THE FIGURE

The FIGURE represents a preferred embodiment of the invention.

DESCRIPTION OF THE INVENTION

Figure 1:
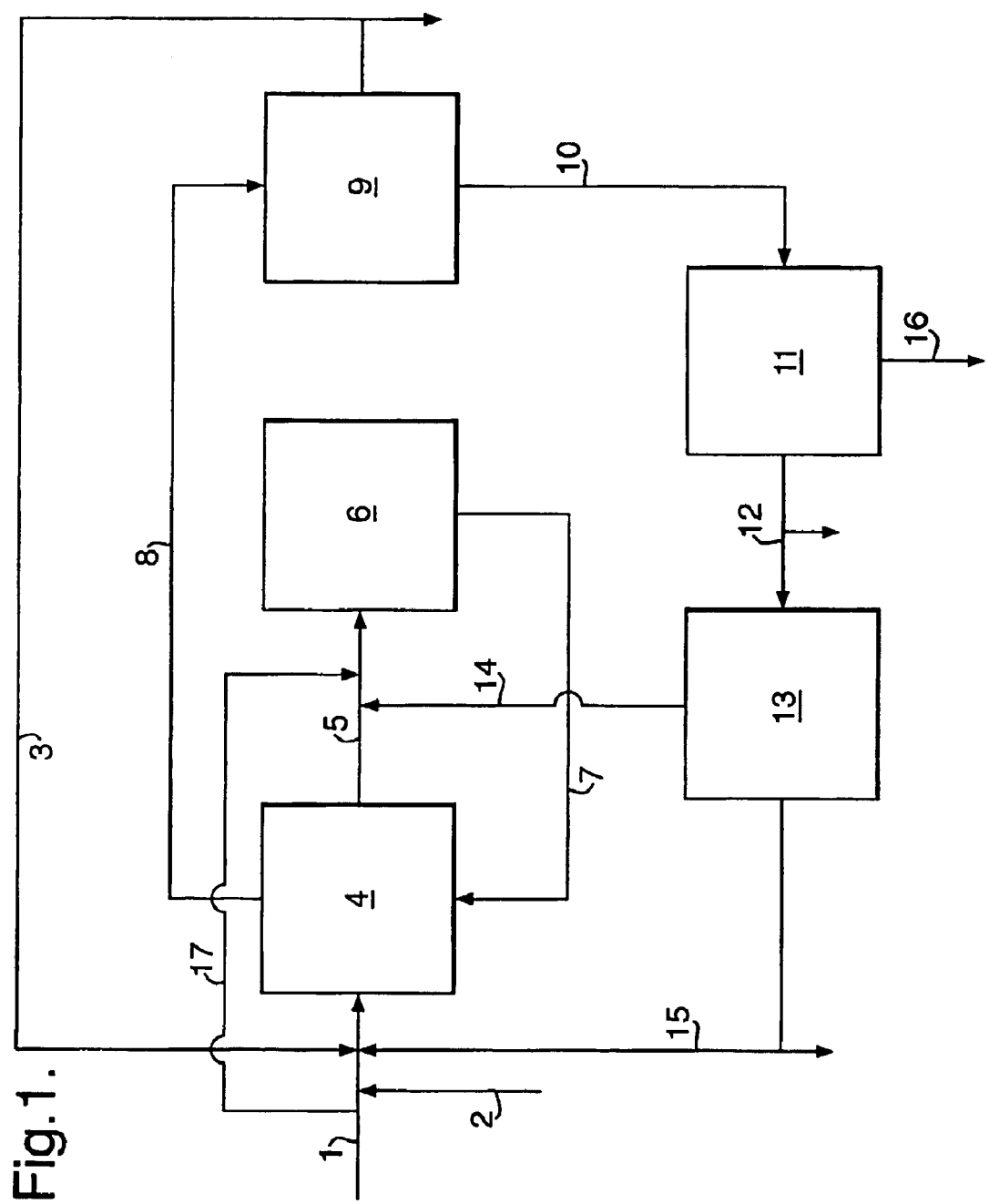

When compared with the known processes, the process of the present invention results in a more efficient process. Due to the set-up of the process and the further integration an improved overall carbon efficiency is obtained, while the thermal efficiency of the process is also improved. In this way less carbon dioxide is emitted and less energy is used. Provided that a high conversion to $C_5^+$ hydrocarbons is obtained in the Fischer Tropsch reaction, the process of the present invention results in carbon efficiencies in the range of 60% to 95% and more specifically in the range of 80% to 90% for a typical natural gas and in thermal efficiencies in the range of 65 to 75 and typically around 70%. Compared with similar schemes not using the further integration, it is expected that the carbon efficiency as well as the thermal efficiency improves by several percents. The carbon efficiency is defined as the percentage carbon in the feed ending up in the $C_5^+$ product. The thermal efficiency is defined as the ratio of the lower heating value of the $C_5^+$ product and the lower heating value of the starting hydrocarbonaceous feedstock.

The preparation of synthesis gas by means of a reforming reaction requires a relatively large energy input. When partial oxidation is used, a relatively large amount of energy is produced. Synthesis gas produced by reforming has a relatively high $H_2/CO$ ratio, usually between 5 and 7. Synthesis gas produced by means of partial oxidation usually has an $H_2/CO$ ratio of about 1.7. The user ratio of Fischer Tropsch hydrocarbon synthesis using a cobalt catalyst and producing large amounts of heavy wax is about 2. Further, in the case that heavy wax is produced, hydrogen is needed for hydrocracking the heavy wax into lighter products boiling especially in the kerosene/gasoil range. In some cases additional hydrogen is needed for desulphurisation of the hydrocarbonaceous feed. The off-gas of the Fischer Tropsch reaction (comprising unconverted synthesis gas, $C_1$–$C_4$ hydrocarbons and usually inerts) may be used to generate energy and/or synthesis gas/hydrogen. Carbon dioxide, generated in the production of especially energy/hydrogen/hydrocarbons, may be used as additional feedstream in the reforming and/or partial oxidation reaction, but is especially used for the reforming reaction. Many variations of the overall process are possible, each having its own advantages/disadvantages.

The combination of reforming and partial oxidation results in an optimum energy efficiency. This combination, in which the heat required in the reforming reaction is produced by the partial oxidation reaction, together with a number of carbon dioxide recycles, the preparation of hydrogen by means of extraction from one of the process streams and the recycle of Fischer Tropsch off-gas results in a very high thermal and carbon efficiency.

It is observed that especially the recycle of carbon dioxide extracted from the Fischer Tropsch hydrocarbon synthesis product to the reforming process, in combination with the recycle of $C_1$–$C_4$ to the partial oxidation stage, is advantageous for the efficiency of the process. In a preferred embodiment, the absence of any recycle of carbon dioxide to the partial oxidation stage, which is sometimes preferred in literature references, results in a synthesis gas having an optimum $H_2/CO$ ratio, making it possible to extract hydrogen from one of the gas streams, especially the carbon dioxide depleted stream obtained in step (iii) and producing at the same time a synthesis gas having an $H_2/CO$ ratio which substantially (i.e. within 3 percent, usually within 1 percent) corresponds with the users ratio of the Fischer Tropsch hydrocarbon synthesis.

Preferably, the total reformer product obtained in step (i) (which comprises carbon monoxide and hydrogen and, in addition, usually smaller amounts of carbon dioxide, steam and/or unconverted hydrocarbons) is subjected to the partial oxidation in step (ii). Optionally part of the hydrocarbonaceous feed, e.g. up to 15% wt, preferably between 1 and 10% wt, may be introduced into the partial oxidation zone.

The reforming reactor and the partial oxidation reactor may be integrated into one reactor, for instance as described in GE 3244252. It is preferred to use two separate reactors in order to be able to perform each reaction at its own optimum conditions. In step (i) of the process according to the invention various reforming catalysts can be suitably used, for instance catalysts comprising one or more metals from group 8 of the Periodic Table of Elements, preferably nickel, on a support (e.g. alumina, silica and/or combinations thereof). Step (i) is suitably carried out at a temperature from 500–1100° C., preferably 600–1000° C., and a pressure from 10 to 100 bar, preferably 30–70 bar. The space velocity of the gaseous hydrocarbonaceous feed and steam combined is suitably from 1000–10000 l(S.T.P)/l catalyst/hour, preferably from 4000–7000.

The percentage of hydrocarbonaceous feed which is converted in the first step is suitably between 50 and 98% wt, preferably between 80 and 95 wt %. The ratio of steam/hydrocarbons is suitably between 0.5 and 3.0 mol steam/mol carbon, preferably between 1.0 and 2.0.

The catalytic reforming step (i) may be carried out in a fixed-, moving-, or fluidized bed of catalyst particles; fixed beds of catalysts particles placed inside a plurality of reformer tubes are preferably employed.

The reforming reactor is very suitably a heat exchange steam hydrocarbon reforming reactor. A suitable form is a multitubular reactor in which the tubes are filled with the reforming catalyst. The heating gas flows around the catalyst tubes, preferably in a counter current direction.

Air may be employed as oxygen containing gas for use in step (ii). Preferably an enriched oxygen gas is used, more preferably substantially pure oxygen, i.e. oxygen gas which contains less than 2% vol of contaminants as nitrogen and argon, preferably less than 1% vol of contaminants. The presence of such contaminants is undesirable because it leads to a gradual build up of such gases in the system and it may result in enhanced formation of undesired compounds in the gasification process as HCN or $NH_3$.

Step (ii) of the process of the present invention is preferably carried out non-catalytically at substantially the same pressure of step (i). Catalysts that may be used are especially noble metal catalysts of Group 8 of the Periodic Table suitably rhodium, iridium, platinum and/or palladium. The temperature of the heating gas produced in step (ii) is higher than the temperature inside the reforming zone(s) which are to be heated; suitably the heating gas temperature ranges from 600° C. to 1300° C., preferably from 700° C. to 1100° C. Step (ii) may be combined with an adiabatic steam reforming zone, using a reforming catalyst as described for step (i).

In particular when a relatively high percentage of hydrocarbonaceous feed has been converted in step (i), a remaining part of hydrocarbonaceous feed is preferably applied in step (ii) together with the total reformer product of step (i) and at least part of the carbon dioxide depleted product gas, separated off from the $C_5^+$ hydrocarbons produced in step (iv).

Due to the usually higher temperature of the oxidation zone compared with the reforming zone, the conversion of any remaining hydrocarbonaceous feed will be even higher than attained in step (i), even if steam is introduced into the oxidation zone together with reformer product, with the oxygen-containing gas or as a separate stream, to protect burners in said oxidation zone from overheating.

Moreover, relatively cold hydrocarbonaceous feed and/or other feed streams can be applied for temperature regulating purposes in step (ii).

The hydrocarbonaceous feed for the process according to the invention is usually gaseous and, if liquid, is a product different from the liquid hydrocarbons produced, (e.g. condensate (mainly $C_3$–$C_6$ hydrocarbons) or heavy hydrocarbons (residual oils as short residue). Preferably, the hydrocarbonaceous feed comprises large amounts of methane, e.g. in the form of natural or associated gas. In the case of a feed with a relatively high sulphur content, the feed is at least partly desulphurized, preferably with hydrogen extracted from one of the product streams.

At least part, and preferably substantially all (i.e. more than 90%, especially more than 95%), of the carbon dioxide present in the heating gas with which the reforming zone(s) have been heated in step (ii) is removed in step (iii) by means of e.g. liquid absorption (with e.g. organic amines) or adsorption on molecular sieves or membranes. Steam is suitably removed simultaneously with carbon dioxide and may be re-used after reheating. Preferably all the carbon dioxide thus removed is combined with the total hydrocarbonaceous feed. Alternatively, different amounts of carbon dioxide, varying from 50, especially 70, more especially 90, up to 99% vol, may be combined with the feedstreams for step (i). Furthermore, additional amounts of carbon dioxide from extraneous sources can be used.

In step (iv) of the process according to the present invention a hydrogen- and carbon monoxide-containing gas obtained in step (iii) is converted in one or more steps at least partly into liquid hydrocarbons in the presence of a Fischer Tropsch type catalyst which preferably comprises at least one metal (compound) selected from group 8 of the Periodic Table. Preferred catalytic metals are iron and cobalt, especially cobalt. It is preferred to produce a very heavy product in step (iv). This results in a relatively low amount of light hydrocarbons, e.g. $C_1$–$C_4$ hydrocarbons, resulting in a higher carbon efficiency. Large amounts of heavy products may be produced by catalysts which are known in the literature (e.g. vanadium or manganese promoted cobalt catalysts) under suitable conditions, i.e. relatively low temperatures and relatively low $H_2/CO$ ratios. Any hydrocarbons produced in step (iv) boiling above the middle distillate boiling range may be converted into middle distillates by means of hydrocracking. Such a step will also result in the hydrogenation of the product as well as in (partial) isomerization of the product.

The Fischer Tropsch synthesis is, as indicated above, preferably carried out with a catalyst producing large amounts of unbranched paraffinic hydrocarbons boiling above the middle distillate range. Relatively small amounts of oxygen containing compounds are produced. The process is suitably carried out at a temperature of 150 to 300° C., preferably 190 to 260° C., and a pressure from 20 to 100 bar, preferably from 30 to 70 bar. In the hydrocracking process preferably at least the fraction boiling above the middle distillate boiling range is hydrocracked into middle distillate. Preferably all $C_5^+$, especially all $C_{10}^+$ hydrocarbons are hydrocracked in view of the improved pour point of the middle distillates obtained in such a process.

The temperature in the second stage is preferably from 250 to 400° C., in particular. 300 to 350° C. In the hydrocracking reaction preferably a catalyst is used which contains at least one noble metal from Group B (in particular platinum and/or palladium) on a carrier (in particular silica, alumina or silica/alumina, more particularly amorphous silica alumina). Preferably such catalysts contain 0.1 to 2% wt of noble metal catalyst.

Hydrogen-containing gas is preferably recovered from product gas obtained in at least one of steps (i)–(iv) of the process according to the invention in order to provide hydrogen needed in any stage of the overall process. Preferably, the hydrogen is recovered from the carbon dioxide depleted gas obtained in step (iii). Another preferred option is to use a part of the product stream produced in step (i), in view of its high hydrogen content. It is observed that such an integrated process, which not only converts the hydrocarbonaceous feedstock into synthesis gas followed by conversion into Fischer Tropsch hydrocarbons but also produces hydrogen, is more economically than the use of a dedicated hydrogen manufacturing unit.

Hydrogen is preferably recovered by means of "pressure swing adsorption", using molecular sieves wherein components other than hydrogen are selectively adsorbed at a higher pressure and desorbed at a lower pressure, thereby producing the hydrogen at a pressure substantially the same as the feed pressure. As the main component of the other components is carbon monoxide, it is preferred after re-pressurisation to reintroduce the carbon monoxide into the main stream. Alternatively, hydrogen is recovered by means of semi-permeable membranes wherein hydrogen with a relatively high purity is recovered at a low pressure and the remainder of the stream has a pressure substantially equal to the feed pressure.

The product stream obtained in step (iv) is separated into a relatively light stream and a relatively heavy stream. The relatively light stream (off gas) comprises mainly unconverted synthesis gas, inerts, carbon dioxide and the $C_1$–$C_3$ hydrocarbons, preferably the $C_1$–$C_4$ hydrocarbons.

At least part, and preferably substantially all (i.e. more than 90%, especially more than 95%), of the carbon dioxide present in the off gas of step (iv) is removed in step (v) by means of e.g. liquid absorption (with e.g. organic amines), adsorption on molecular sieves or membranes. Preferably all the carbon dioxide thus removed is combined with the total hydrocarbonaceous feed. Alternatively, different amounts of carbon dioxide, varying from 50, especially 70, more especially 90, up to 99% vol, may be combined with the feedstreams for step (i).

The invention will be elucidated by means of the Figure in which a preferred embodiment of the process is schematically depicted.

A hydrocarbonaceous feed is introduced through line 1, combined with steam via line 2 and carbon dioxide-containing gas recycled through line 3, into a heat exchange steam hydrocarbon reformer 4. The reformed product is introduced via line 5 together with hydrocarbonaceous feed from step (iv) into partial oxidation reactor 6. The product obtained in the partial oxidation reactor is introduced via line 7 into the reforming reactor 4 as heating gas. Via line 8 the cooled down heating gas is fed to carbon dioxide removing reactor 9. Carbon dioxide removed in this reactor is led via line (3) to the reforming reactor. The carbon dioxide depleted stream is led via line 10 to the Fischer Tropsch reactor 11. The off-gas is led via line 12 to carbon dioxide removing reactor 13. The carbon dioxide depleted stream is led via line 14 to line 5. Carbon dioxide removed in this reactor may be led via line 15 to the reforming reactor. The hydrocarbon product stream 16 obtained in (iv) is led via line 17 to the work-up section. A part of the hydrocarbonaceous feed may be used led to the partial oxidation reactor 6 via line 17.

We claim:

1. A process for producing liquid hydrocarbons from a hydrocarbonaceous feedstock which comprises the following steps:
   (i) catalytically reforming at least part of the hydrocarbonaceous feedstock at elevated temperature and pressure with steam in at least one reforming zone;
   (ii) heating the reforming zone(s) by means of a carbon dioxide containing heating gas comprising a product obtained by partial oxidation of reformer product obtained in step (i) and carbon dioxide depleted light product obtained in step (vi) with an oxygen containing gas in an oxidation zone;
   (iii) separating carbon dioxide from cooled down heating gas obtained in step (ii);

(iv) catalytically converting at least part of the carbon dioxide depleted gas stream obtained in step (iii) at elevated temperature and pressure into normally liquid hydrocarbons;

(v) separating product steam obtained in step (iv) into a light product comprising mainly unconverted synthesis gas, inerts and light hydrocarbons and a heavy product comprising mainly normally liquid and solid hydrocarbons;

(vi) separating carbon dioxide from light product obtained in step (v); and (vii) combining at least part of the carbon dioxide feed obtained in step (iii) and step (vi) with hydrocarbonaceous feed for step (i).

2. The process of claim 1, in which step (i) is carried out in a heat exchange steam hydrocarbon reforming reactor, comprising a multitubular reactor.

3. The process of claim 1, in which step (ii) is carried out in a partial oxidation reactor, and in which the total reformer product obtained in step (i) is subjected to partial oxidation in step (ii).

4. The process of claims 1, in which part of the hydrocarbonaceous feedstock of step (i) is subjected to partial oxidation in step (ii) together with the other reactants.

5. The process of claims 1, in which the oxygen containing gas comprises substantially pure oxygen.

6. The process of claims 1, in which substantially all carbon dioxide is removed from the cooled down heating gas obtained in step (ii), and in which in step (vi) substantially all carbon dioxide is removed from the light product obtained in step (v).

7. The process of claim 1, in which at least 50% vol of the carbon dioxide obtained in step (iii) is used in step (vii), and in which at least 50% vol of the carbon dioxide obtained in steps (vi) is used in step (vii).

8. The process of claim 1, in which process no carbon dioxide is recycled to the partial oxidation process of step (ii).

9. The process of claim 1, in which hydrogen-containing gas is recovered from product gas obtained in at least one of steps (i)–(vi).

10. The process of claim 9, in which at least part of the recovered hydrogen is used is step (iv) or for the work-up of the heavy product obtained in step (v).

11. The process of claim 2, in which step (ii) is carried out in a partial oxidation reactor, and in which the total reformer product obtained in step (i) is subjected to partial oxidation in step (ii).

12. The process of claim 2, in which part of the hydrocarbonaceous feedstock of step (i) is subjected to partial oxidation in step (ii) together with the other reactants.

13. The process of claim 3, in which part of the hydrocarbonaceous feedstock of step (i) is subjected to partial oxidation in step (ii) together with the other reactants.

14. The process of claim 2, in which the oxygen containing gas comprises substantially pure oxygen.

15. The process of claim 3, in which the oxygen containing gas comprises substantially pure oxygen.

16. The process of claim 4, in which the oxygen containing gas comprises substantially pure oxygen.

17. The process of claim 2, in which substantially all carbon dioxide is removed from the cooled down heating gas obtained in step (ii), and in which in step (vi) substantially all carbon dioxide is removed from the light product obtained in step (v).

18. The process of claim 3, in which substantially all carbon dioxide is removed from the cooled down heating gas obtained in step (ii), and in which in step (vi) substantially all carbon dioxide is removed from the light product obtained in step (v).

19. The process of claim 4, in which substantially all carbon dioxide is removed from the cooled down heating gas obtained in step (ii), and in which in step (vi) substantially all carbon dioxide is removed from the light product obtained in step (v).

20. The process of claim 5, in which substantially all carbon dioxide is removed from the cooled down heating gas obtained in step (ii), and in which in step (vi) substantially all carbon dioxide is removed from the light product obtained in step (v).

* * * * *